(12) United States Patent
Hawley et al.

(10) Patent No.: US 11,694,550 B1
(45) Date of Patent: Jul. 4, 2023

(54) SYSTEMS AND METHODS FOR DETERMINING VEHICLE PARKING SCORES

(71) Applicant: Ford Global Technologies, LLC, Dearborn, MI (US)

(72) Inventors: Taylor Hawley, Oak Park, MI (US); Jeremy Lerner, Southfield, MI (US); Ali Abdallah, Dearborn, MI (US); Scott Huggins, Novi, MI (US); Danielle Rosenblatt, Madison Heights, MI (US); Mohammad Abouali, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/659,829

(22) Filed: Apr. 19, 2022

(51) Int. Cl.
  *B60W 30/06* (2006.01)
  *B60W 40/09* (2012.01)
  *G08G 1/14* (2006.01)

(52) U.S. Cl.
  CPC .......... *G08G 1/143* (2013.01); *B60W 30/06* (2013.01); *B60W 40/09* (2013.01); *G08G 1/146* (2013.01); *G08G 1/148* (2013.01); *B60W 2420/52* (2013.01); *B60W 2552/53* (2020.02)

(58) Field of Classification Search
  None
  See application file for complete search history.

(56) References Cited

U.S. PATENT DOCUMENTS

| | | | |
|---|---|---|---|
| 10,169,995 B2 | 1/2019 | Bostick et al. | |
| 10,182,316 B1 | 1/2019 | Tu et al. | |
| 10,755,570 B1 | 8/2020 | Zhou et al. | |
| 11,062,602 B1 | 7/2021 | Beaurepaire et al. | |
| 11,436,924 B1* | 9/2022 | Gray | G06Q 40/08 |
| 2011/0006917 A1* | 1/2011 | Taniguchi | B62D 15/028 340/932.2 |

OTHER PUBLICATIONS

Ratnadira Widyasari et al., IOT-Based Smart Parking System Development, Nov. 13-14, 2019.

* cited by examiner

*Primary Examiner* — John F Mortell
(74) *Attorney, Agent, or Firm* — Brandon Hicks; Eversheds Sutherland (US) LLP

(57) ABSTRACT

This disclosure describes systems and methods for determining vehicle parking scores. An example method may include calculating, subsequent to a first vehicle parking within a first parking space of a parking lot and based on first sensor data obtained by the first vehicle, a first vehicle parking score. The example method may also include calculating, subsequent to a second vehicle parking within the first parking space of the parking lot and based on second sensor data obtained by the second vehicle, a second vehicle parking score. The example method may also include calculating a first average vehicle parking score for the first parking space based on the first vehicle parking score and the second vehicle parking score. The example method may also include presenting an indication of the first average vehicle parking score for the first parking space to a third vehicle within the parking lot.

17 Claims, 7 Drawing Sheets

SYSTEMS AND METHODS FOR DETERMINING VEHICLE PARKING SCORES

BACKGROUND

Drivers and automated vehicle systems may oftentimes lack information regarding difficulties that prior drivers and/or automated vehicle systems may have had in parking within particular parking spaces. Drivers also generally receive only high-level feedback, if any, regarding how well their vehicle is parked and fits within a parking space after a parking operation is performed. This may increase the difficulty for drivers and automated vehicle systems in decision-making associated with selecting a parking space to park within.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
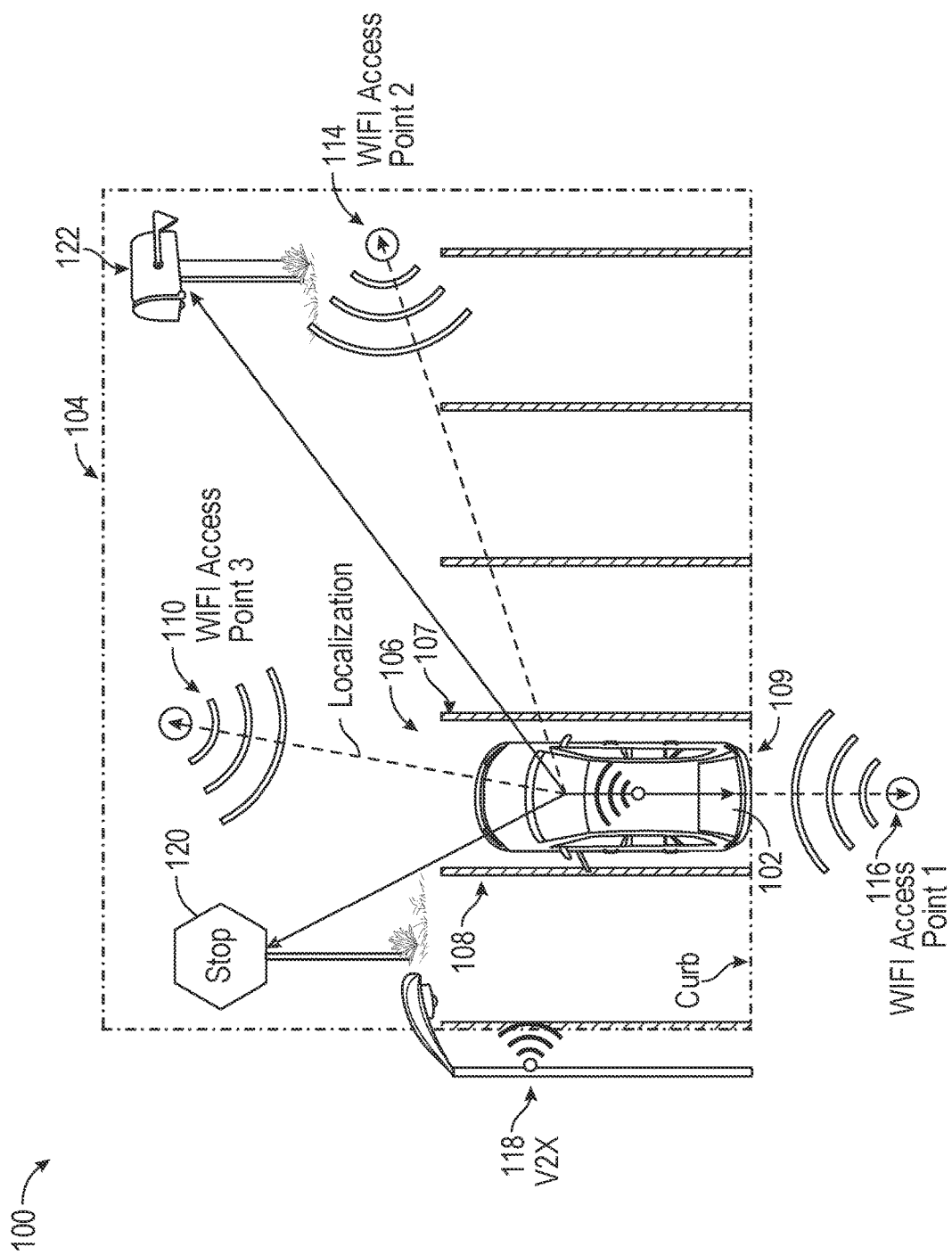
FIG. 1 illustrates an example system, in accordance with one or more embodiments of the disclosure.

This disclosure relates to, among other things, systems and methods for determining vehicle parking scores. At a high level, connected vehicle parking data can be used to improve the parking process for future drivers and inform parking lot owners of locations in the parking lot that may be associated with parking problems (such as the vehicles being damaged or numerous vehicles parking poorly and taking up multiple parking spaces). To accomplish this, historical parking data may be collected and parking scores for each parking space within a parking lot may be calculated based on this data. These parking scores may indicate to future drivers how well prior drivers were typically able to park within the parking spaces (distance from the edges of the vehicle to the parking space lines, etc.). This may allow drivers to make calculated decisions about which parking spaces to use. Similarly, the parking scores may be used by vehicles equipped with semi-autonomous or autonomous capabilities to automatically select a parking space within a parking lot in which to perform an autonomous parking operation.

In one or more embodiments, beginning with the data collection process, once a vehicle has completed parking within a parking space (either autonomously, semi-autonomously, or manually by a driver), the vehicle may use any number of different sensors to estimate how accurately the vehicle has parked within a parking space. For example, the vehicle may use cameras, radar, LiDAR, ultra-wideband sensors, and/or any other types of sensors. Additionally or alternatively, a vehicle can use advanced localization methods to determine how close the vehicle (for example, a center point on the vehicle and/or any other point on the vehicle) is located relative to an ideal location within that parking space. For example, such techniques may involve techniques described in U.S. application Ser. No. 17/323,851 titled "Systems and Methods of Projecting Virtual Parking Lines," which is incorporated herein by reference, as well as any other methods described herein in otherwise. This ideal location may vary depending on the type of vehicle as well (that is, the ideal parking location may not necessarily be the same for every vehicle). For example, the length of some vehicles may be greater than the length of the parking space, so the center of the vehicle may be ideally situated ahead of the center of the parking space, depending on the parking lot and parking space configuration.

In one or more embodiments, the parking accuracy determinations may also be made based on sensors associated with other connected vehicles and/or connected infrastructure within the parking lot. That is, rather than the parking vehicle using its sensors to determine its location within the parking space, sensors associated with other nearby vehicles or infrastructure may instead be used. Additionally, in some cases, the accuracy determinations may be made locally at the parking vehicle, at any other vehicles and/or infrastructure collecting data, and/or at a remote location (for example, data may be captured and sent to a remote server for analysis).

In one or more embodiments, based on the data collected subsequent to the vehicle completing the parking, a parking score may be calculated. Such scores may range from −100 to +100 (however, any other range of values may also be used as well), where positive scores may indicate that the vehicle is fully within the parking space (and negative scores indicate that the vehicle is at least partially outside of the parking space). The score may be calculated based on the distance from the center of the vehicle to the center of the parking space (this distance calculation may also be split into the distance to the center in the x-direction and distance to the center in the y-direction). Further illustrations of such calculations may be provided in at least FIGS. 2A-2D. These distances may be calculated based on any number of different localization methods to accurately localize the vehicle within a particular parking space. The score may also be calculated based on the detected distance from the edge of the vehicle to the parking space lines (as well as the implied line at the end of the parking space lines indicating the back and front of the parking space) and/or based on any other reference point. When other vehicles are present, the proximity to those vehicles may also be used to create the score (as parking between two vehicles is generally different than parking between two empty parking spaces). Additionally, the angle the vehicle makes relative to the parking space may be considered in creating the score. This may be further illustrated in at least FIG. 2D.

In one or more embodiments, the score may linearly (or exponentially) decrease from +100 to 0 (or any other value range) based on the distance from the center of the vehicle to the center of the parking space (with the score approaching 0 when a side of the vehicle is located at the parking space line). Additionally, the angle of the vehicle relative to the parking space lines may be weighted. The scores may also decrease and/or increase in any other manner (for example, exponentially, etc.) and may include any other types and/or ranges of values as well.

In one or more embodiments, the methodology for calculating the score may consider the size of the vehicle and the size of the parking space (as well as real-time sensing for other vehicles or objects obstructing the parking space). For example, for a parking space that is eight feet wide, a vehicle that is 8.5 feet wide may not be capable of obtaining a positive score (as the vehicle would not fit within the parking space). As another example, for a parking space that is eight feet wide, a vehicle that is 7.5 feet wide, the maximum score may be +60 because it may be impossible to leave "sufficient" space on both sides of the vehicle (to allow parking and vehicle ingress/egress for the host and neighboring vehicles). Further, parking spaces may also be scored based on any specified needs of the driver, for example, a vehicle occupant may require access to a wheelchair lift and additional space on the right side of the vehicle to enter and exit the vehicle. Given this, parking spaces that do not allow for this space may be associated with lower scores.

Given such constraints, drivers may be informed of the maximum score that their vehicle may attain for a particular parking space prior to parking (based on either real-time sensed information about the parking space or a map containing metadata and location information about parking spaces in parking lots) based on the size of the vehicle, the size of the parking space, specific driver needs, etc. Further, drivers may be informed about the expected difficulty of parking in a particular parking space in advance of parking (based on historical vehicle maneuvers while parking in that stall). That is, the average number of maneuvers required to park the vehicle in the stall (and obtain at least a certain parking score) may be tracked from historical connected vehicle data and drivers may be provided this information. For example, a parking space near the parking lot entrance may typically require a 180-degree turn (which requires four maneuvers on average from drivers who have parked there and obtained a score of at least +50), but a parking space that can be driven straight into from the entrance (for example, most drivers require no turns to park within it, so the average number of maneuvers may be 0.5 for drivers who obtained a score of at least +50) will generally be easier to park in.

In one or more embodiments, drivers may be informed of the average parking score for a particular parking space before parking in the parking space. In some cases, the average parking score that is presented to the driver may also be specific to the type of vehicle the driver is parking. For example, if the driver is parking a truck, the average parking score that is presented may only be based on historical parking scores associated with trucks. However, the average parking score that is presented to the driver may also be based on any other number of factors as well, such as any type of vehicle, weather conditions, time of day, etc. The parking scores may automatically be adjusted based on these conditions and/or vehicle types being applicable, or all of these different parking scores may be presented to the user for selection. This could allow drivers to pick a parking space based on an expected parking difficulty to enable them to pick a space that will be relatively easy to park well within. Further, drivers may also pick parking spaces based on the history in that most other vehicles have parked sufficiently well so the vehicle is unlikely to be damaged by another parking vehicle (or a door opening into it) or another vehicle to block ingress to the vehicle when the driver returns. Drivers may also be informed of a score for a parking space based on their personal driving history, for example, they may have struggled with parallel parking (i.e. gotten very low scores) so the estimated difficulty for a parallel parking job would be high.

In one or more embodiments, parking spaces may also be scored based on the potential damage that the vehicle may incur. For example, if many connected vehicles that have parking in a particular parking space have incurred damage from other vehicles, then drivers can be informed of the likelihood of damage that they may incur if they park in that parking space. Examples of such parking spaces may include small, closely-spaced together parking, parking spaces near the parking lot entrance (vehicle in such spaces may incur more damage from vehicles entering the parking lot quickly), parking spaces at the bottom of a slope that may have a higher likelihood of being hit by a shopping cart, etc. Given this information, drivers (and/or autonomous vehicle parking systems) can avoid the parking spaces and parking lot owners can attempt to reconfigure the parking spaces to avoid damage to vehicles. Further, parking lot owners can be informed of parking spaces with parking space lines that are difficult to identify by vehicle sensors or by drivers.

In one or more embodiments, the parking score may include more than one score. For example, the parking score may be presented as three distinct scores during and after the parking process. For example, these three distinct scores may include a spot average difficulty (with vehicle size corrections), a parking job accuracy score (adjusted based on environmental factors), and the risk score of parking there for a given time. However, the parking score may also be presented as a single score or any other number of scores as well.

Figure 3:
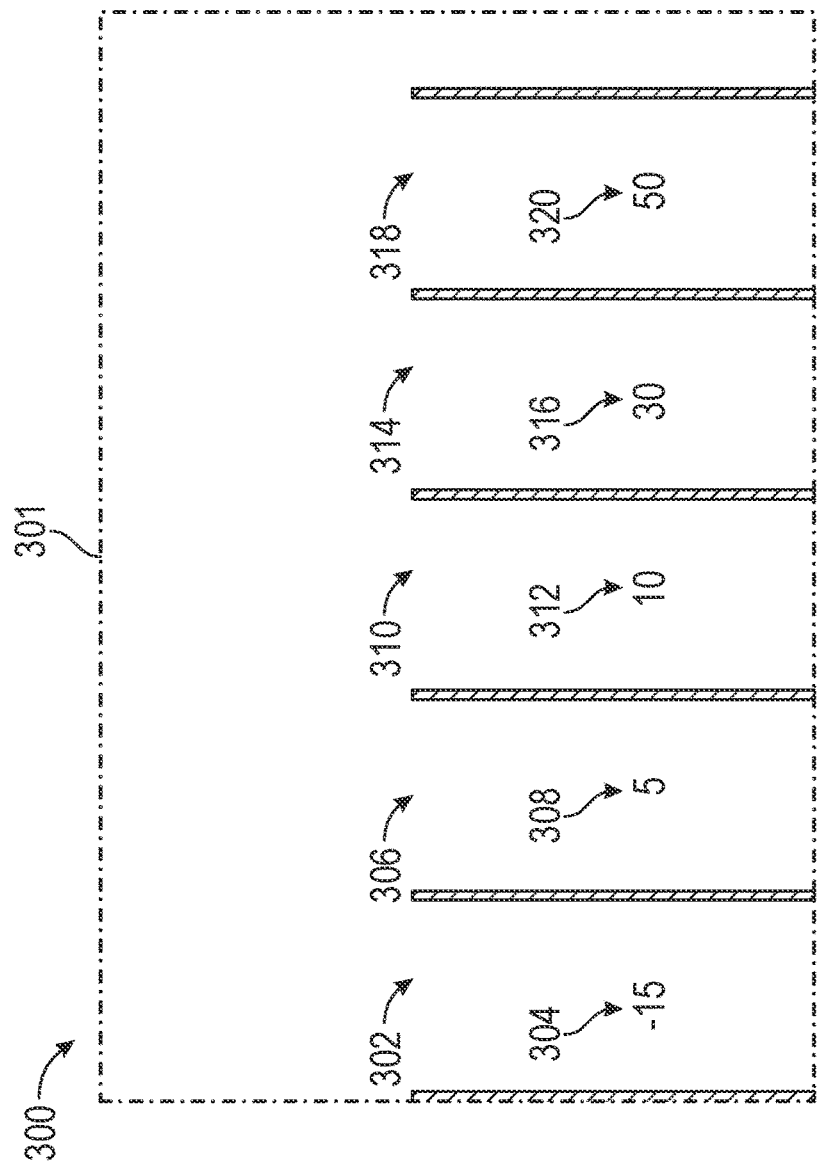
FIG. 3 illustrates an example of vehicle parking scores, in accordance with one or more embodiments of the disclosure.

In one or more embodiments, once parking scores are determined for parking spaces within a parking lot, average parking scores for each parking space may be presented to a driver or an automated vehicle system. Any other statistical analysis may also be performed on the data, rather than relying on an average score (for example, a maximum or minimum score, a median score, etc.). Additionally, contextual information that resulted in the particular score may also be presented. For example, text may be presented indicating a reason as to why a parking score for one parking space is significantly lower than a score for another space. If presented to a driver, the scores may be presented on a display, such as a human-machine interface (HMI) of the vehicle or a mobile device application (for example). For example, a map of the parking lot may be presented to the driver (as shown in FIG. 3, for example), and each parking space within the parking lot may be associated with an average parking score. Based on these scores, a driver may make an informed decision as to which parking space to park within. If the vehicle has semi-autonomous or autonomous capabilities, the vehicle may semi-autonomously or autonomously park within a given parking space if the average parking score is sufficiently low, but does not engage the semi-autonomous or autonomous parking functionality if the score is sufficiently high (for example, crosses a threshold value). Further, the score that may initiate automated re-parking could vary based on the parking lot (and parking space) history and current status. That is, if the parking lot is extremely busy (i.e. the vehicle senses many other vehicles driving around and/or very few empty parking spaces), parking to not obstruct other parking spaces is of more importance than if the parking lot is not busy. This may also depend on any number of other factors as well. Additionally, a vehicle with semi-autonomous or autonomous capabilities may select a parking space for semi-autonomous or autonomous parking regardless of the parking scores. However, in such cases, the vehicle may use the parking scores to select the best parking space to park within (for example, a space with the highest average parking score may be selected by an autonomous vehicle for parking.

In one or more embodiments, the parking scores may be used for other purposes as well. For example, if a particular parking space has a history of very low scores for a wide variety of vehicle types, a parking lot owner can be informed that that parking space may have some mitigating factor that is impacting the ability of drivers to park appropriately. Additionally, parking lot owners may utilize vehicle connectivity capabilities (for example, V2V, V2X, cellular, Wi-Fi, etc.) to charge drivers who park poorly a parking surcharge. Similarly, drivers may be offered a discount if their parking score is over a certain value (this value could be adjusted based on the business of the parking lot). For example, when the parking lot is busy, drivers who score below −10 may be charged $0.25 for obstructing multiple parking spaces, and drivers who score above +80 may be given a discount of $0.25. Similarly, if the parking lot is not busy (for example, many open parking spaces are detected, or based on a known busy time of day and day of the week), then drivers who score below −50 may be charged $0.02 and drivers who score above +95 may be given a discount of $0.02. The maximum total discount (and potentially the maximum total charge) given per vehicle within a given time period may be capped to ensure drivers do not continuously park and re-park to accrue discounts (or charges).

In one or more embodiments, the process may also be gamified and drivers may be featured on leaderboards as "expert parkers" relative to how well they park in certain lots or even globally. Other data, such as how frequently drivers parallel park/perpendicular/back into a parking space, and the average scores obtained.

Turning to the figures, FIG. 1 illustrates an example system 100, in accordance with one or more embodiments of the disclosure.

In one or more embodiments, the system 100 may include a vehicle 102 that is depicted as being parked within a parking space 106 of a parking lot 104.

In one or more embodiments, the system 100 may illustrate several different methods may be used to accurately localize the vehicle to a particular parking space. As a first example, the GPS location of the vehicle may be determined. Any error in GPS location may be mitigated by using multiple methods for localization at once. As a second example, Wi-Fi localization may be used (for example, using multiple Wi-Fi access points (APs), such as AP 110, AP 114, and/or AP 116, to determine the vehicle 102 location). As a third example, localization relative to nearby physical structures (for example, stop sign 120 and mailbox 122) may be used. This may be performed, for example, using image processing, radar, LiDAR, etc. As a fourth example, localization may be performed using V2X infrastructure 118. In some cases, the infrastructure may have a record of all parking space locations and direct vehicles to those locations and where to project the lines relative to the vehicle's exact location as detected by fixed sensors. As a fifth example, the vehicle may utilize its local sensors to make determinations as to its location within the parking space as well.

In one or more embodiments, localization may first be used to determine which parking space 106 the vehicle 102 is positioned within, and then more specific calculations may be used to determine how well the vehicle 102 is parked within the parking space 106. For example, these more specific calculations may involve performing center point distance calculations may be performed to make this determination. The center point may be the reference point on the vehicle that may be used to determine relative distances in a given parking space. Examples of how the center point of the parking space and/or the center point of the vehicle are used to perform such calculations may be described in additional detail with respect to FIGS. 2A-2C. Additionally, it should be noted that such calculations may be performed using any other reference points as well, such as other points within the parking space and the vehicle (for example, sides, front, or back of the vehicle and/or parking space, etc.). That is, the calculations are not limited to just the center point.

In one or more embodiments, rather than strictly using the vehicle center point, the inclusion of vehicle corners or protruding items (for example, ladders, winches, rear hatch glass open, etc.) may also be included in the scoring. For example, a vehicle could be represented as a box where the length of the vehicle could be halved and added to and subtracted from the center coordinate and similar with the vehicle width to determine a full vehicle footprint. Vehicles with wide tires or items extending beyond the basic footprint may also factor into scoring.

FIGS. 2A-2D illustrate example vehicle parking score calculations, in accordance with one or more embodiments of the disclosure.

Figure 2A:
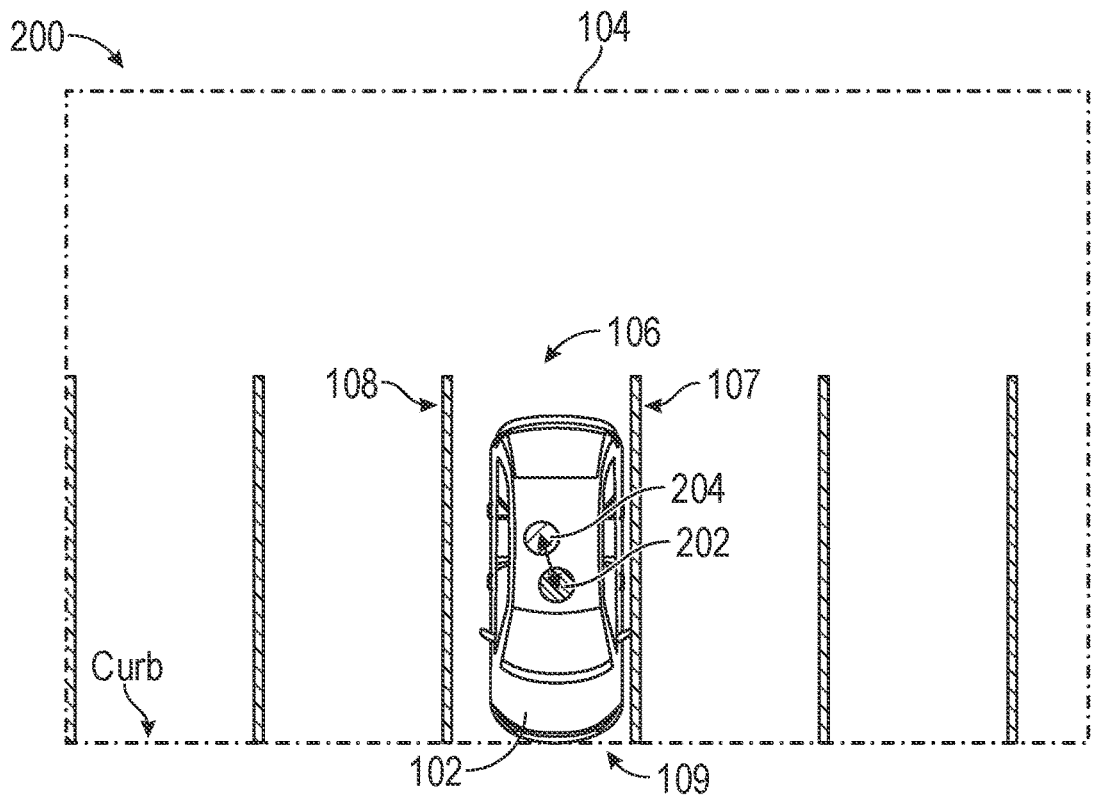
FIGS. 2A-2D illustrate example vehicle parking score calculations, in accordance with one or more embodiments of the disclosure.

Beginning with, FIG. 2A, a first example vehicle parking score calculation 200 is illustrated. After parking is performed by the vehicle 102 (as shown in the figure), the final parking position of the vehicle 102 may be analyzed to calculate a vehicle parking score for the vehicle 102 within the particular parking space 106. In this particular example, the vehicle center point 202 may be located 0.7 feet from the parking space center point 204 and the vehicle 102 is entirely within the parking space 106. Given these conditions, the vehicle parking score may be a non-negative value. The magnitude of this non-negative value may be a function of the distance between the vehicle center point 202 and the parking space center point 204. In this case, the score could be +50, for example. The smaller the distance between the vehicle center point 202 and the parking space center point 204, the larger the resulting vehicle parking score.

Figure 2B:
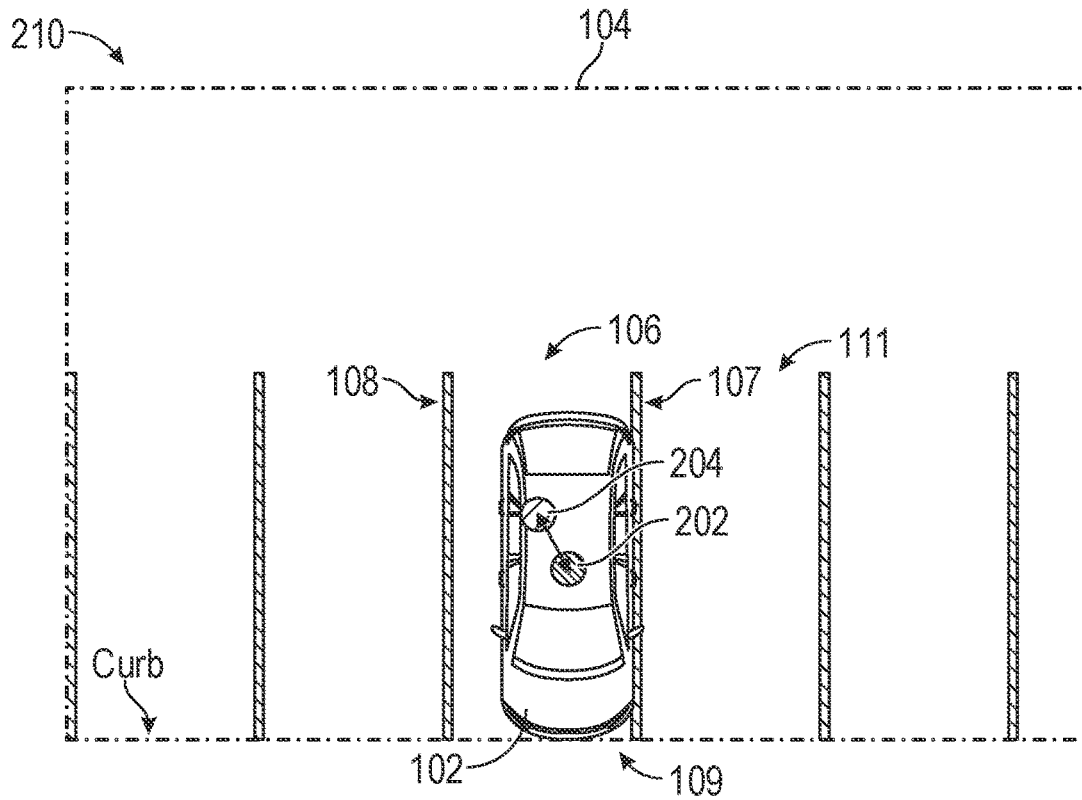

Turning to FIG. 2B, a second example vehicle parking score calculation 210 is illustrated. In this example, the vehicle center point 202 may be located 1.6 feet from the parking space center point 204, and the vehicle 102 is entirely within the parking space 106 (so the vehicle parking score is non-negative). However, the vehicle parking score may take into consideration that the vehicle 102 is precisely on the parking space line 107, and no space remains for vehicle ingress and/or egress (for example, a driver or passenger may not be able to enter or exit the vehicle if a second vehicle is parked in the adjacent parking space 111. Given this, the vehicle parking score may be 0. As additional distance is provided between the vehicle 102 and the parking space line 107, the vehicle parking score may increase.

Figure 2C:
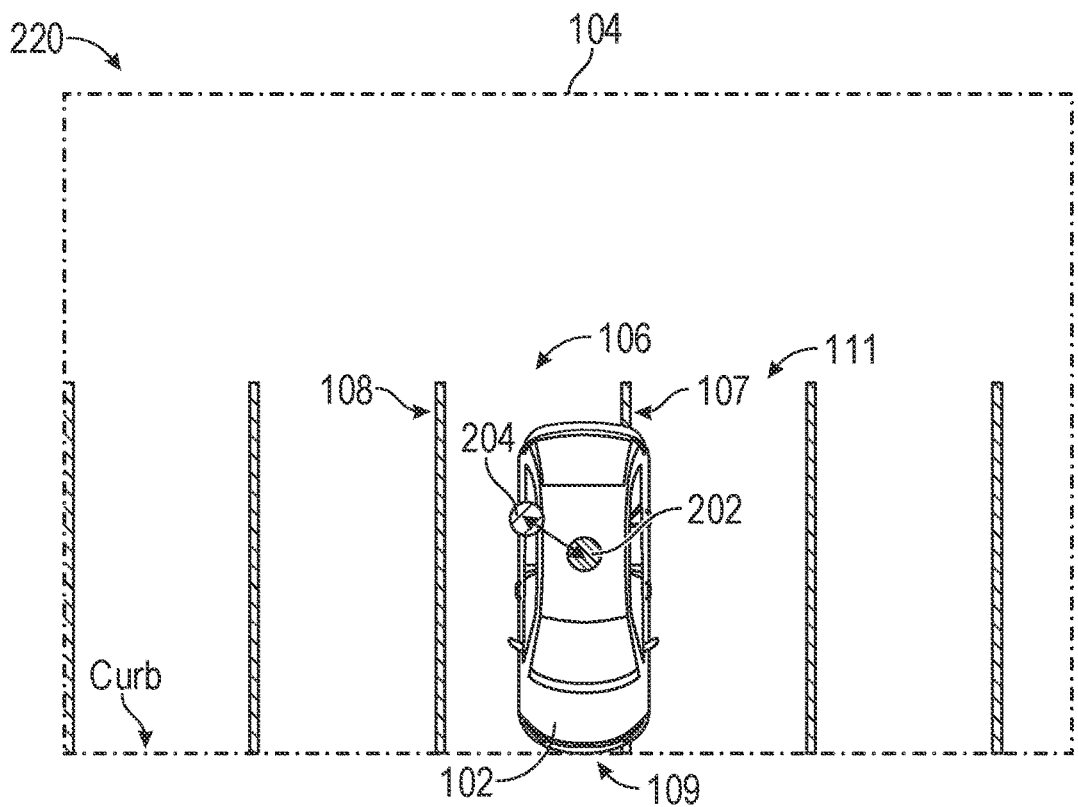

Turning to FIG. 2C, a third example vehicle parking score calculation 220 is illustrated. In the example, the vehicle center point 202 may be located 2.2 feet from the parking space center point 204, and the vehicle 102 is partly in the adjacent parking space. Given this, the vehicle parking score may be a negative value. Therefore, the vehicle parking score may be a function of this distance and may take into consideration how far the vehicle is within the adjacent parking space 111. For example, the vehicle parking score may be a value of −55.

Figure 2D:
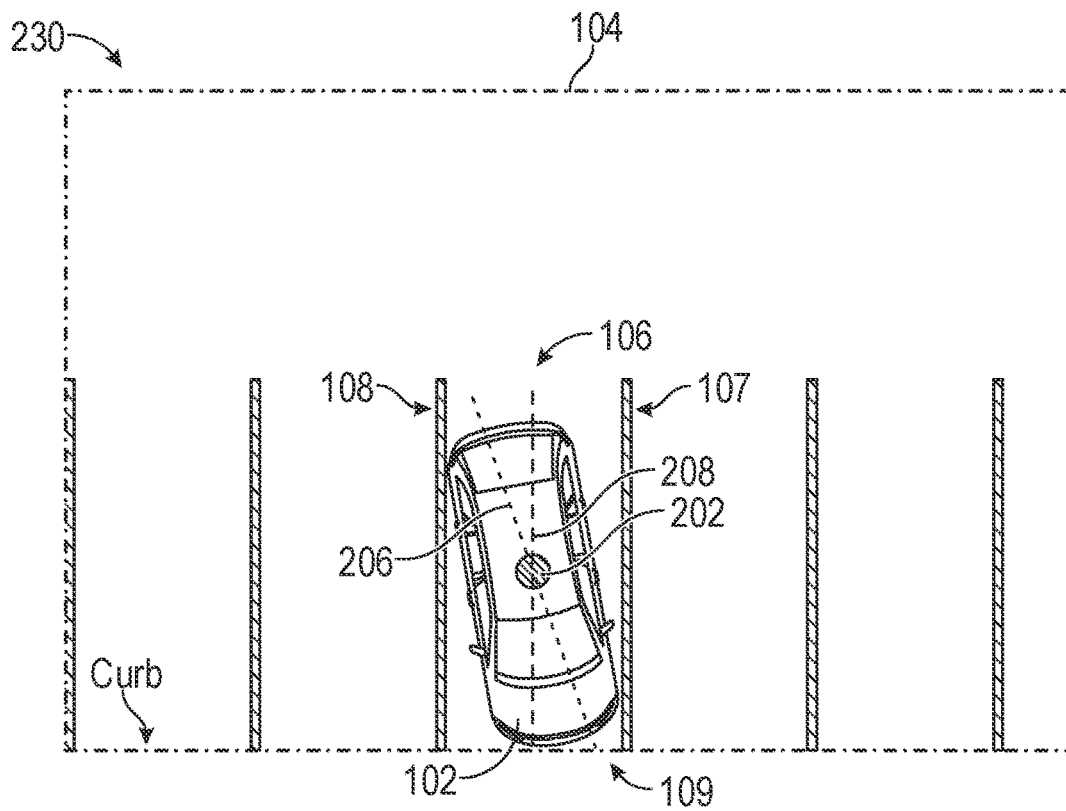

Turning to FIG. 2D, a fourth example vehicle parking score calculation 230 is illustrated. Particularly, FIG. 2D illustrates that additional data may be considered when calculating a vehicle parking score in addition to the distance between the vehicle center point 202 and the parking space center point 204. For example, another consideration may include the alignment of the vehicle 102. There may exist situations where there is zero distance between the vehicle center point 202 and the parking space center point 204, however, the vehicle may be rotated within the parking space 106 and still may not be aligned with the parking space 106. This alignment may be calculated by determining an angle between a first imaginary line 208 that is parallel with the parking space lines 107 and 108 that crosses through the parking space center point 204, and a second imaginary line 206 that is parallel with the sides of the vehicle 102 and crosses through the vehicle center point 202. This misalignment may affect the ability of other drivers to park in any adjacent parking spaces. This aspect of the vehicle parking score may, in some cases, be reported separately, so that issues arising from the parking tightness and how well the driver has aligned the car may be differentiated. Thus, a parking score for a vehicle that is incapable of properly parking in a parking space due to an adjacent vehicle being partially within the parking space may not be as negatively impacted as a parking score in which the parking vehicle simply did not properly park regardless of external factors.

In one or more embodiments, once a vehicle parking score is determined, it may be provided and/or stored as one data point of numerous data points that may be obtained for that parking space and any other parking spaces within a parking lot. In this manner, an average vehicle parking score for each parking space within the parking lot may be calculated. These vehicle parking scores may indicate the difficulty that drivers or vehicle systems have in properly parking the vehicle within given parking spaces within the parking lot. If presented to a driver, the vehicle parking scores may be presented on a display, such as through an HMI of the vehicle or a mobile device application of the user. The display may include a map of the parking lot (as illustrated in FIG. 3) with vehicle parking scores associated with each parking space. Based on this information, the driver and/or an autonomous vehicle system may be able to determine which parking space (if any) within the parking lot to park within. For example, a parking space with a higher average parking score may indicate a parking space that is less difficult to more properly park within that may result in less damage to the vehicle (for example, the vehicle may park such that it is sufficiently distant from other vehicles in adjacent parking spaces).

In one or more embodiments, the average parking score that is presented to the driver may also be specific to the type of vehicle the driver is parking. For example, if the driver is parking a truck, the average parking score that is presented may only be based on historical parking scores associated with trucks. However, the average parking score that is presented to the driver may also be based on any other number of factors as well, such as any type of vehicle, parking scores under certain weather conditions, at certain times of day, etc. The presented of such parking scores may automatically be adjusted based on these conditions and/or vehicle types being applicable, or all of these different parking scores may be presented to the user for selection. This could allow drivers to pick a parking space based on an expected parking difficulty to enable them to pick a space that will be relatively easy to park well within. Further, drivers may also pick parking spaces based on the history in that most other vehicles have parked sufficiently well so the vehicle is unlikely to be damaged by another parking vehicle (or a door opening into it) or another vehicle to block ingress to the vehicle when the driver returns. Drivers can also be informed of a score for a parking space based on their personal driving history, for example, they may have struggled with parallel parking (i.e. gotten very low scores) so the estimated difficulty for a parallel parking job would be high.

It should be noted that while calculations may be described with respect to a center point of the vehicle and/or the parking space, these are merely exemplary reference points. Any other reference points besides the center point may also be used as well. For example, a distance between a side of the vehicle and a side of the parking space, front of the vehicle and front of the parking space, etc.

FIG. 3 illustrates an example of vehicle parking scores 300, in accordance with one or more embodiments of the disclosure. Particularly, the figure may illustrate an example of information that may be presented to a driver of a vehicle, including at least an average score per parking space for vehicles that have parked. For example, the parking lot 301 may include several parking spaces (for example, parking space 302, parking space 306, parking space 310, parking space 314, and parking space 318). Each parking space may include an associated average vehicle parking score (for example, average vehicle parking score 304, average vehicle parking score 308, average vehicle parking score 312, average vehicle parking score 316, and average vehicle parking score 320). This provides the driver and/or a parking lot manager the ability to identify parking spaces with consistent issues which may be caused by tighter spaces, poor road conditions, faded lines, etc. This information may also be provided to an autonomous vehicle system, which may allow the autonomous vehicle system to make an automated determination as to which parking space to park within. For example, the autonomous vehicle may automatically select to park within the parking space 318 because it is associated with the highest average parking score.

Figure 4:
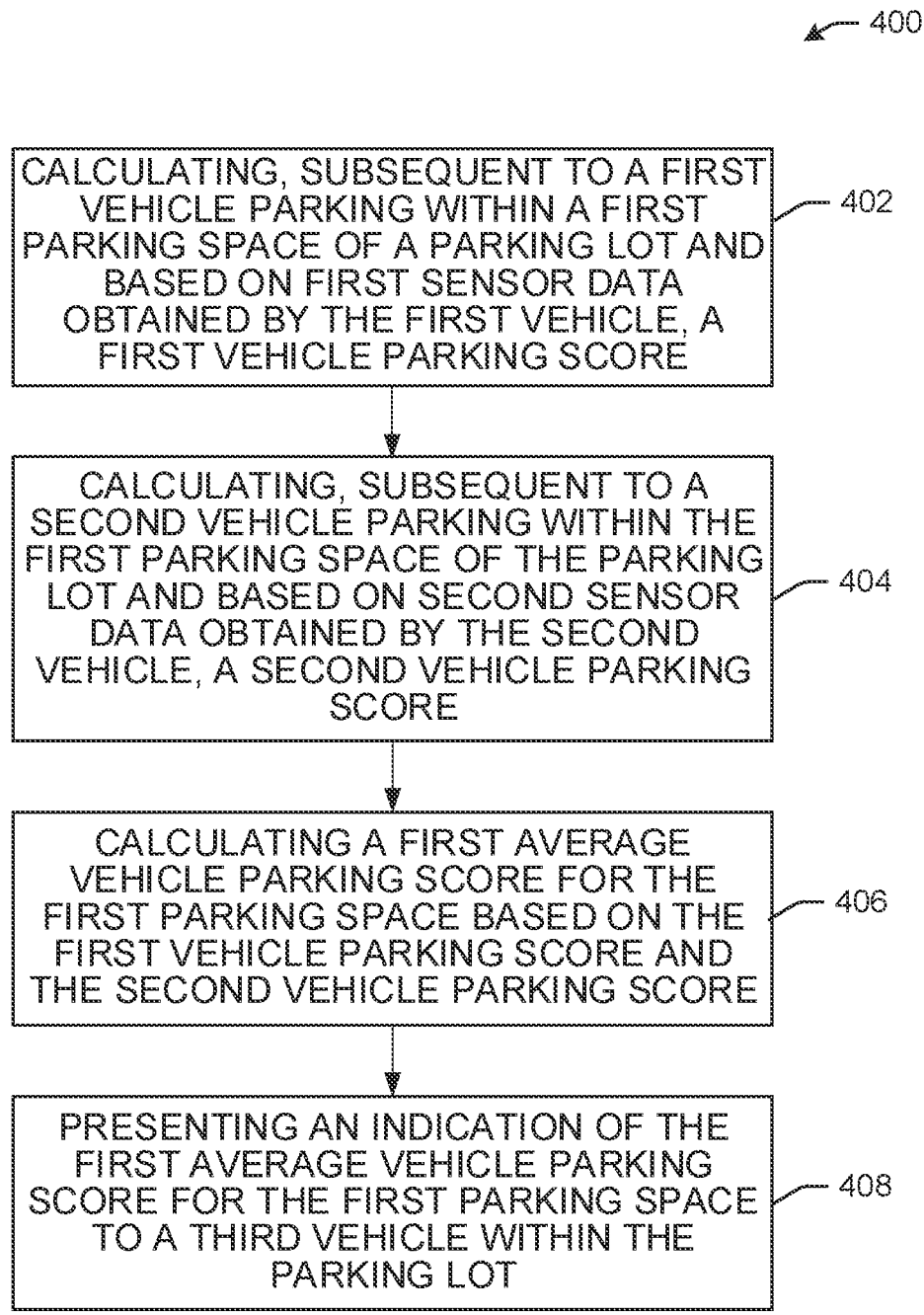
FIG. 4 illustrates an example method, in accordance with one or more embodiments of the disclosure.

FIG. 4 illustrates an example method 400, in accordance with one or more embodiments of this disclosure. At block 402, the method 400 may include calculating, subsequent to a first vehicle parking within a first parking space of a parking lot and based on first sensor data obtained by the first vehicle, a first vehicle parking score. At block 404, the method 400 may include calculating, subsequent to a second vehicle parking within the first parking space of the parking lot and based on second sensor data obtained by the second vehicle, a second vehicle parking score. At block 406, the method 400 may include calculating a first average vehicle parking score for the first parking space based on the first vehicle parking score and the second vehicle parking score. At block 408, the method 400 may include presenting an indication of the first average vehicle parking score for the first parking space to a third vehicle within the parking lot.

In one or more embodiments, the method 400 may also include performing an autonomous parking operation within the first parking space based on the first average vehicle parking score.

In one or more embodiments, the method 400 may also include determining, subsequent to the first vehicle completing the parking, a location of a center point of the vehicle. The method 400 may also include determining a distance between the location of the center point of the vehicle and an expected center point of the first vehicle within the first parking space, wherein the first vehicle parking score is based on the distance.

In one or more embodiments, the second vehicle is a different size than the first vehicle, and wherein an expected center point of the second vehicle is in a different location within the first parking space based on the second vehicle being a different size than the first vehicle.

In one or more embodiments, calculating the first vehicle parking score further comprises determining an alignment of the vehicle within the first parking space.

In one or more embodiments, the method 400 may include calculating, subsequent to a fourth vehicle parking within the first parking space of the parking lot and based on third sensor data obtained by the fourth vehicle, a third vehicle parking score, wherein the fourth vehicle is the same vehicle type as the first vehicle and a different vehicle type than the second vehicle. The method 400 may also include calculating a second average parking score for the first parking space based on the first vehicle parking score and the third vehicle parking score. The method 400 may also include determining that a fifth vehicle in the parking lot is a same vehicle type as the fourth vehicle. The method 400 may also include presenting an indication of the second average parking score for the first parking space to the fifth vehicle instead of the first average vehicle parking score based on the determination that the fifth vehicle is a same vehicle type as the fourth vehicle.

In one or more embodiments, the method 400 may also include presenting an indication of a third average parking score for a second parking space to the third vehicle within the parking lot.

Figure 5:
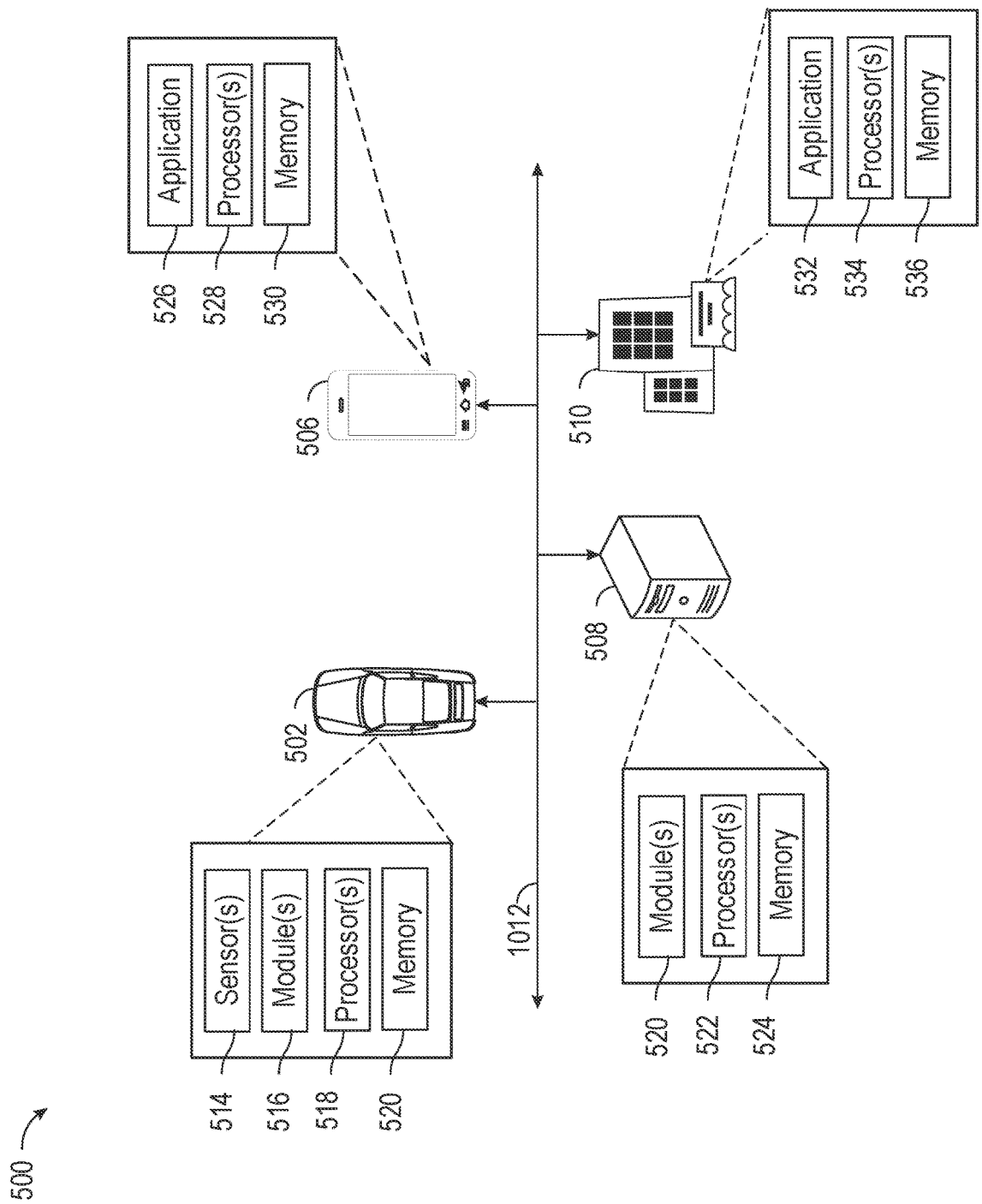
FIG. 5 illustrates an example of a system, in accordance with one or more embodiments of this disclosure.

FIG. 5 illustrates an example of a system 500, in accordance with one or more embodiments of this disclosure. In one or more embodiments, the system 500 may include at least one or more vehicles 502, one or more user devices 506, one or more servers 508, and/or infrastructure 510.

In one or more embodiments, a vehicle 502 may include any vehicle described herein, such as a vehicle that has already parked within a parking space, a vehicle that intends to park within a parking space, and/or vehicles in the vicinity that capture data relating to a vehicle parking job. A vehicle 502 may include any type of vehicle (for example, electric vehicle, hybrid vehicle, internal combustion engine vehicle, autonomous or semi-autonomous vehicle, etc.). If the vehicle is a fully autonomous vehicle (or a vehicle with some autonomous functionality), any determinations described herein as potentially being made by a driver may automatically be determined by the vehicle. That is, an autonomous vehicle may use any parking scores described herein to assess parking spaces within a parking lot and determine which parking space to automatically park within. Thus, the parking scores may simply assist the automated vehicle system in better determining which parking space to select.

In one or more embodiments, the one or more user devices 506 may be devices that may be used by a user associated with a vehicle 502 that may park at a parking location including virtual parking spaces. For example, a user device 506 may include a smartphone, laptop, desktop, or the like. A user device 506 may allow a user to perform any number of functions, such as viewing parking score information (for example, as illustrated in FIG. 3). Additionally, a vehicle 502 may include a human-machine interface (HMI) that may allow the user to perform the same or similar functions.

In one or more embodiments, the infrastructure systems 510 may be systems existing at the parking location that may assist in performing any of the operations described herein. For example, the infrastructure systems may include buildings at the parking location, camera systems, and/or any other types of infrastructure. In one or more embodiments, the one or more servers 508 may be remote servers that may perform any of the analyses described herein. For example, the remote servers 508 may receive parking data and may calculate parking scores based on the data. The remote servers 508 may also perform averaging of historical data and/or any other calculations. The remote servers 508 may also perform any other functions described herein. As aforementioned, any of the operations described herein as being performed by the survey vehicle 502 may also be performed by infrastructure 510 and/or a remote server 508.

Figure 6:
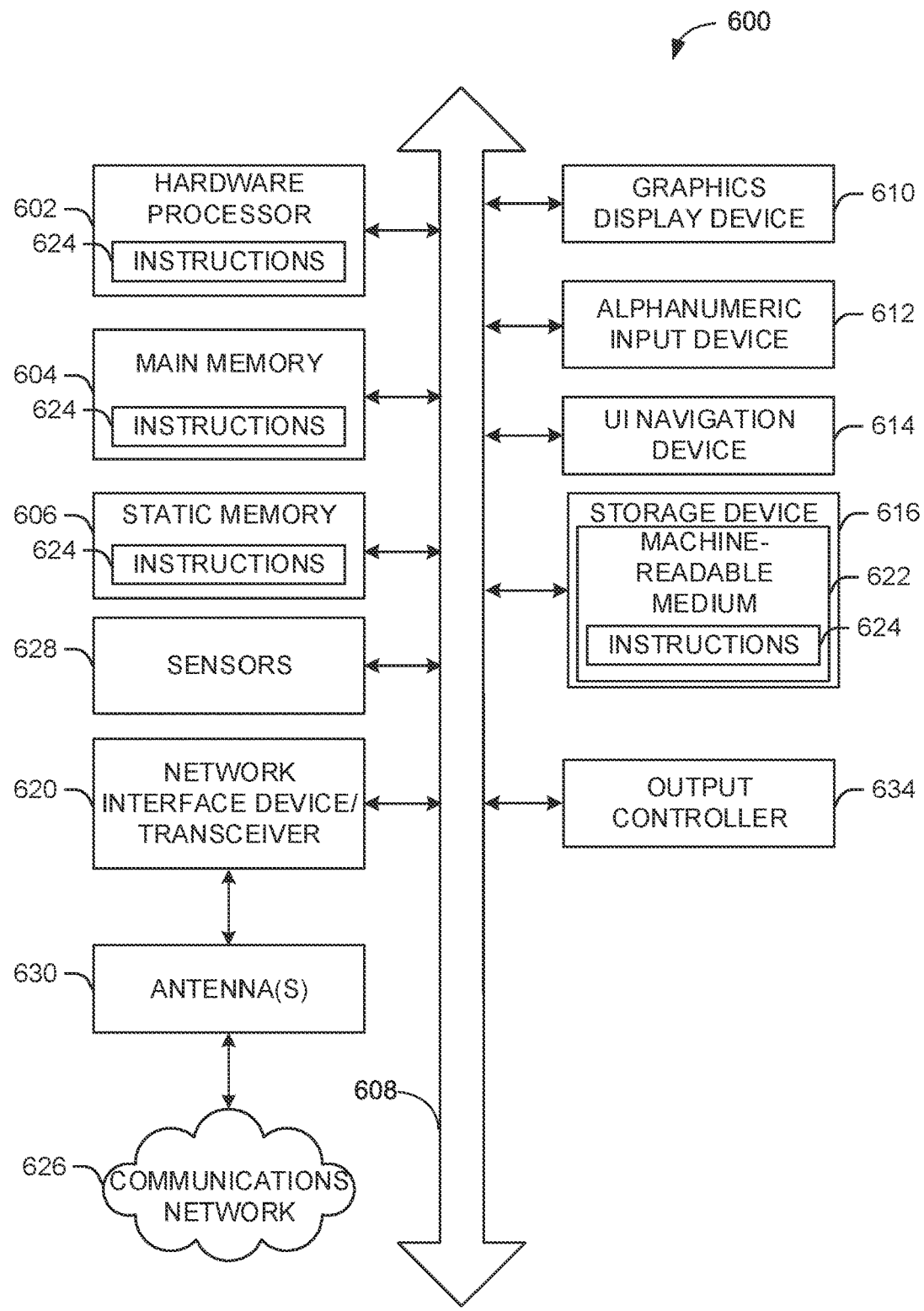
FIG. 6 illustrates an example of a computing system, in accordance with one or more embodiments of this disclosure.

In one or more embodiments, any of the one or more vehicles 502, one or more user devices 506, and/or one or more servers 508 and/or any other elements of the system 500 may include any of the components of the machine 600 described with respect to FIG. 6. That is, as illustrated in the figure, these elements of the system 500 may include one or more processor(s) and memory, as well as at least any other elements described as being included in the machine 1000. That is, although the figure may only depict a particular element of system 500 as having one or more processors, memory, and one or more modules, this may not be intended to be limiting in any way.

FIG. 6 depicts a block diagram of an example machine 600 upon which any of one or more techniques (e.g., methods) may be performed, in accordance with one or more example embodiments of the present disclosure. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
   a processor; and
   a memory storing computer-executable instructions, that when executed by the processor, cause the processor to:
   calculate, subsequent to a first vehicle parking within a first parking space of a parking lot and based on first sensor data obtained by the first vehicle, a first vehicle parking score;
   calculate, subsequent to a second vehicle parking within the first parking space of the parking lot and based on second sensor data obtained by the second vehicle, a second vehicle parking score;
   calculate a first average vehicle parking score for the first parking space based on the first vehicle parking score and the second vehicle parking score; and
   present an indication of the first average vehicle parking score for the first parking space to a third vehicle within the parking lot;
   calculate, subsequent to a fourth vehicle parking within the first parking space of the parking lot and based on third sensor data obtained by the fourth vehicle, a third vehicle parking score, wherein the fourth vehicle is a same vehicle type as the first vehicle and a different vehicle type than the second vehicle;
   calculate a second average parking score for the first parking space based on the first vehicle parking score and the third vehicle parking score;
   determine that a fifth vehicle in the parking lot is a same vehicle type as the fourth vehicle; and
   present an indication of the second average parking score for the first parking space to the fifth vehicle instead of the first average vehicle parking score based on the determination that the fifth vehicle is a same vehicle type as the fourth vehicle.

2. The system of claim 1, wherein the computer-executable instructions further cause the processor to:
   perform an autonomous parking operation within the first parking space based on the first average vehicle parking score.

3. The system of claim 1, wherein calculating the first vehicle parking score further comprises:
   determine, subsequent to the first vehicle completing the parking, a location of a center point of the first vehicle; and
   determine a distance between the location of the center point of the first vehicle and an expected center point of the first vehicle within the first parking space, wherein the first vehicle parking score is based on the distance.

4. The system of claim 3, wherein the second vehicle is a different size than the first vehicle, and wherein an expected center point of the second vehicle is in a different location within the first parking space based on the second vehicle being a different size than the first vehicle.

5. The system of claim 1, wherein calculating the first vehicle parking score further comprises determining an alignment of the first vehicle within the first parking space.

6. The system of claim 1, wherein the computer-executable instructions further cause the processor to:
present an indication of a third average parking score for a second parking space to the third vehicle within the parking lot.

7. A method comprising:
calculating, subsequent to a first vehicle parking within a first parking space of a parking lot and based on first sensor data obtained by the first vehicle, a first vehicle parking score;
calculating, subsequent to a second vehicle parking within the first parking space of the parking lot and based on second sensor data obtained by the second vehicle, a second vehicle parking score;
calculating a first average vehicle parking score for the first parking space based on the first vehicle parking score and the second vehicle parking score; and
presenting an indication of the first average vehicle parking score for the first parking space to a third vehicle within the parking lot;
calculating, subsequent to a fourth vehicle parking within the first parking space of the parking lot and based on third sensor data obtained by the fourth vehicle, a third vehicle parking score, wherein the fourth vehicle is a same vehicle type as the first vehicle and a different vehicle type than the second vehicle;
calculating a second average parking score for the first parking space based on the first vehicle parking score and the third vehicle parking score;
determining that a fifth vehicle in the parking lot is a same vehicle type as the fourth vehicle; and
presenting an indication of the second average parking score for the first parking space to the fifth vehicle instead of the first average vehicle parking score based on the determination that the fifth vehicle is a same vehicle type as the fourth vehicle.

8. The method of claim 7, further comprising:
performing an autonomous parking operation within the first parking space based on the first average vehicle parking score.

9. The method of claim 7, wherein calculating the first vehicle parking score further comprises:
determining, subsequent to the first vehicle completing the parking, a location of a center point of the first vehicle; and
determining a distance between the location of the center point of the first vehicle and an expected center point of the first vehicle within the first parking space, wherein the first vehicle parking score is based on the distance.

10. The method of claim 9, wherein the second vehicle is a different size than the first vehicle, and wherein an expected center point of the second vehicle is in a different location within the first parking space based on the second vehicle being a different size than the first vehicle.

11. The method of claim 7, wherein calculating the first vehicle parking score further comprises determining an alignment of the first vehicle within the first parking space.

12. The method of claim 7, further comprising:
presenting an indication of a third average parking score for a second parking space to the third vehicle within the parking lot.

13. A non-transitory computer-readable medium storing computer-executable instructions, that when executed by a processor, cause the processor to:
calculate, subsequent to a first vehicle parking within a first parking space of a parking lot and based on first sensor data obtained by the first vehicle, a first vehicle parking score;
calculate, subsequent to a second vehicle parking within the first parking space of the parking lot and based on second sensor data obtained by the second vehicle, a second vehicle parking score;
calculate a first average vehicle parking score for the first parking space based on the first vehicle parking score and the second vehicle parking score; and
present an indication of the first average vehicle parking score for the first parking space to a third vehicle within the parking lot;
calculate, subsequent to a fourth vehicle parking within the first parking space of the parking lot and based on third sensor data obtained by the fourth vehicle, a third vehicle parking score, wherein the fourth vehicle is a same vehicle type as the first vehicle and a different vehicle type than the second vehicle;
calculate a second average parking score for the first parking space based on the first vehicle parking score and the third vehicle parking score;
determine that a fifth vehicle in the parking lot is a same vehicle type as the fourth vehicle; and
present an indication of the second average parking score for the first parking space to the fifth vehicle instead of the first average vehicle parking score based on the determination that the fifth vehicle is a same vehicle type as the fourth vehicle.

14. The non-transitory computer-readable medium of claim 13, wherein the computer-executable instructions further cause the processor to:
perform an autonomous parking operation within the first parking space based on the first average vehicle parking score.

15. The non-transitory computer-readable medium of claim 13, wherein calculating the first vehicle parking score further comprises:
determine, subsequent to the first vehicle completing the parking, a location of a center point of the first vehicle; and
determine a distance between the location of the center point of the first vehicle and an expected center point of the first vehicle within the first parking space, wherein the first vehicle parking score is based on the distance.

16. The non-transitory computer-readable medium of claim 15, wherein the second vehicle is a different size than the first vehicle, and wherein an expected center point of the second vehicle is in a different location within the first parking space based on the second vehicle being a different size than the first vehicle.

17. The non-transitory computer-readable medium of claim 13, wherein calculating the first vehicle parking score further comprises determining an alignment of the first vehicle within the first parking space.

* * * * *